June 25, 1963     E. M. BARBER     3,094,974
INTERNAL COMBUSTION ENGINE
Filed Oct. 23, 1961     4 Sheets-Sheet 1

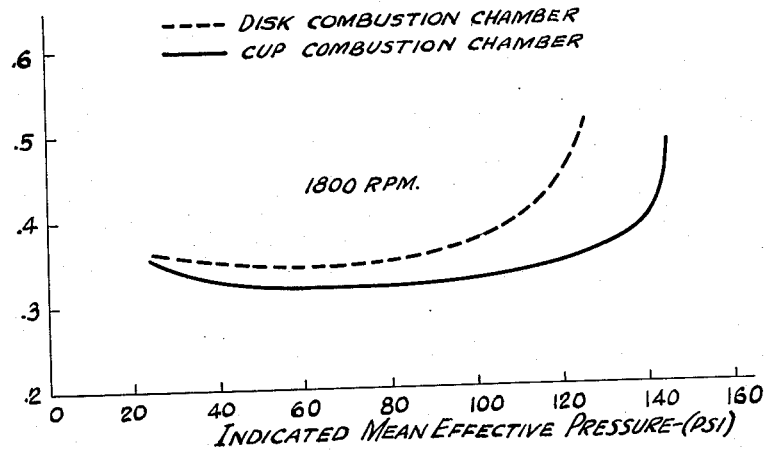
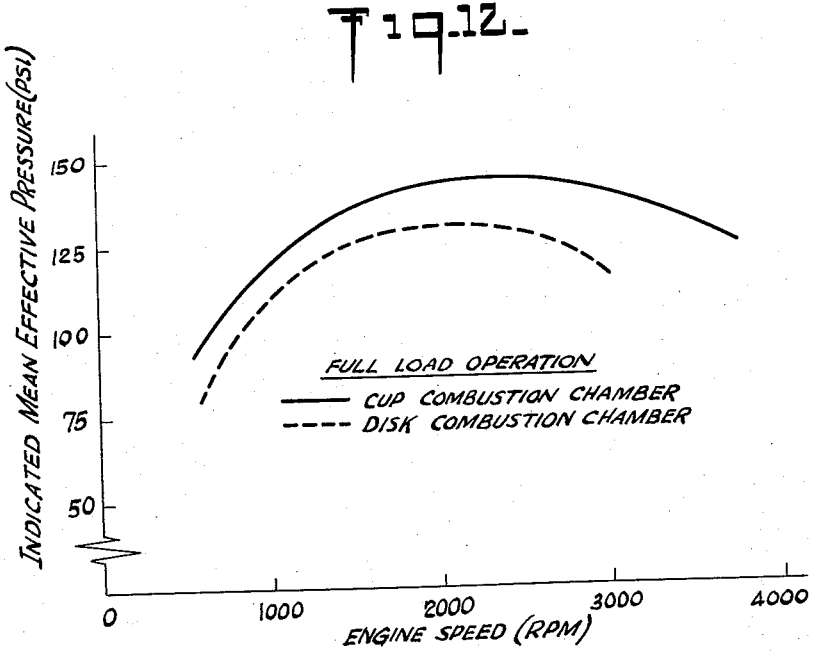

3,094,974
Patented June 25, 1963

3,094,974
INTERNAL COMBUSTION ENGINE
Everett M. Barber, Wappingers Falls, N.Y., assignor to Texaco Inc., New York, N.Y., a corporation of Delaware
Filed Oct. 23, 1961, Ser. No. 147,021
17 Claims. (Cl. 123—32)

This invention relates generally to an internal combustion engine and the method of operating the same, as disclosed and claimed basically in my U.S. Patent No. 2,484,009, issued on October 11, 1949, and more particularly, is concerned with such an operating engine having a cup shape combustion chamber in the piston.

In accordance with the disclosure in my above cited patent, an improved combustion process is carried out within an internal combustion engine in a manner such that knocking will not occur, irrespective of the octane or cetane number of the fuel employed, or the compression ratio or the fuel-air mixture ratio used. This is accomplished by preventing fuel from mixing with that portion of the air within the combustion space of an engine cylinder which normally would form the combustible so-called "end gases," and by reducing the residence time of combustible mixture in the cylinder to the extent that there is insufficient time for spontaneous ignition to occur prior to normal combustion, and by providing positive ignition means.

In the preferred embodiment of the patented invention, air unmixed with fuel or air containing insufficient fuel to support combustion is introduced into and caused to swirl around the engine combustion chamber at a controlled rate of swirl with respect to the engine speed. The air supply to the engine is not throttled as in conventional gasoline (Otto cycle) engines, load control being achieved by regulating the amount of fuel injected and the duration of fuel injection.

Fuel injection under high pressure is begun into the compressed swirling air or fuel air mixture during the latter part of the compression stroke of each engine cycle such that a localized, ignitable fuel-air mixture is formed adjacent the point of fuel ignition and is ignited immediately by a spark or other suitable means to establish a localized flame front in this portion of the combustion chamber.

As the injection of fuel continues into the area immediately ahead of the flame front region, the fuel mixes with the swirling air and the mixture is burned at the flame front substantially as rapidly as it is formed. The amount of fuel injected and the duration of fuel injection are regulated according to the desired engine output, such, that at full load, the fuel injection duration is approximately equal to the time for the swirling air to make one revolution in the combustion chamber, thereby impregnating substantially all of the air with fuel as the swirling air passes the fuel injection nozzle. At part load, less fuel is injected and the fuel injection duration is reduced to less than the time for one air swirl so that only part of the air is impregnated with fuel as it passes the nozzle location.

With this method of operation, an ignitable mixture is always formed at the ignition means immediately after the beginning of injection without air throttling even when the overall fuel/air mixture is very lean at light loads, and this mixture is ignited positively. Further, combustible mixtures are not present in those portions of the combustion chamber remote from the flame front so that end-gas reaction and detonation or knock cannot occur, and the residence time of the combustible mixture that is formed locally in the combustion chamber is so short that spontaneous ignition cannot occur. Consequently knocking cannot occur irrespective of the octane or cetane number of the fuel used and fuel economy is improved, particularly at part load. In addition, fuels with very broad volatility characteristics can be used.

With respect to four-stroke cycle engines, my basic patent teaches the use of a cylindrical disk-shaped combustion chamber formed by the space between the essentially flat piston crown and cylinder head, with the diameter of the combustion chamber therefor equal to the diameter of the cylinder, and having a directing intake port with a shrouded poppet type valve to provide the required air swirl, the axis of the valve being substantially parallel to the axis of the engine cylinder.

In order to obtain the desired air swirl rate (a minimum swirl r.p.m. of above six times engine r.p.m.) with the disk combustion chamber design, the air entering the cylinder through the intake port must have relatively high velocity, and the intake port flow area must be relatively small. This is detrimental to the high speed volumetric efficiency of the engine. In addition, the disk shaped combustion chamber does not have the most favorable surface-to-volume ratio, so heat losses from the chamber are unnecessarily high. Also, by the nature of the patented construction with a disk combustion chamber design, the maximum air velocity that occurs for a given air swirl rate is high because the combustion chamber diameter is relatively large, and the sources of injection and ignition must be located near the cylinder circumference in the region of highest swirling air velocity. This causes ignition of the fuel-air mixture to be less reliable at the extremes of speed and load because the high velocity air deflects the spray towards the ignition source making the mixture strength at the spark gap variable and dependent on engine speed, swirl rate, cylinder size and the amount of fuel injected, the latter because it effects the stiffness of the fuel spray.

Further, the original Barber non-knocking engine patent does not specifically teach the use of an efficient intake port and passage structure, nor does it teach the use of the most suitable fuel spray shape and location of the ignition source with respect to the fuel spray.

In the case of two-stroke cycle engines, my previous patents, e.g. U.S. No. 2,691,968, or co-assigned patents disclose constructions with similarly less desirable features with regard to combustion chamber shape, air swirl producing inlet means and location of the fuel injection and ignition means.

Accordingly, it is an object of the present invention to obtain an improved non-knocking type of internal combustion engine operating on either a two or four-stroke cycle.

Another object of the invention is to provide an improved combustion chamber in a non-knocking internal combustion engine for reducing heat losses therein and so better the thermal efficiency of the engine.

Still another object of the invention is to provide for improved non-knocking internal combustion engine operation using a cup shape combustion chamber in the piston, in combination with improved intake means for providing high velocity swirling air in the combustion chamber.

It is another object of the invention to obtain the required air swirl rate in the combustion chamber of a non-knocking engine with a less restricting intake means thus improving volumetric efficiency of the engine.

And another object of the invention is to provide higher air swirl rates and improved thermal efficiency in non-knocking internal combustion engine operation with no loss in volumetric efficiency.

Another object of the invention is to provide an improved non-knocking internal combustion engine with a cup shape combustion chamber and improved intake porting such that the minimum acceptable or higher air swirl rates are obtained with improved scavenging.

And still another object of the invention is to obtain improved performance of a non-knocking internal combustion engine having a cup shape combustion chamber by the provision of a more suitable fuel spray shape and location of the ignition source with respect to the fuel spray.

These and other objects of invention will be apparent from the following description when read in conjunction with the accompanying drawings wherein:

FIGS. 11 and 12 are graphs illustrating certain performance characteristics of a four-stroke cycle engine of the present invention in comparison with those from an engine constructed with a disk combustion chamber as disclosed in my above cited basic patent, both engines operating on the patented non-knocking combustion process under similar operating conditions.

The present invention is distinguished by its cup shape combustion chamber located in the piston, in combination with improved intake structures, more suitable fuel spray shape and location, and improved location of the ignition source.

Figure 1:
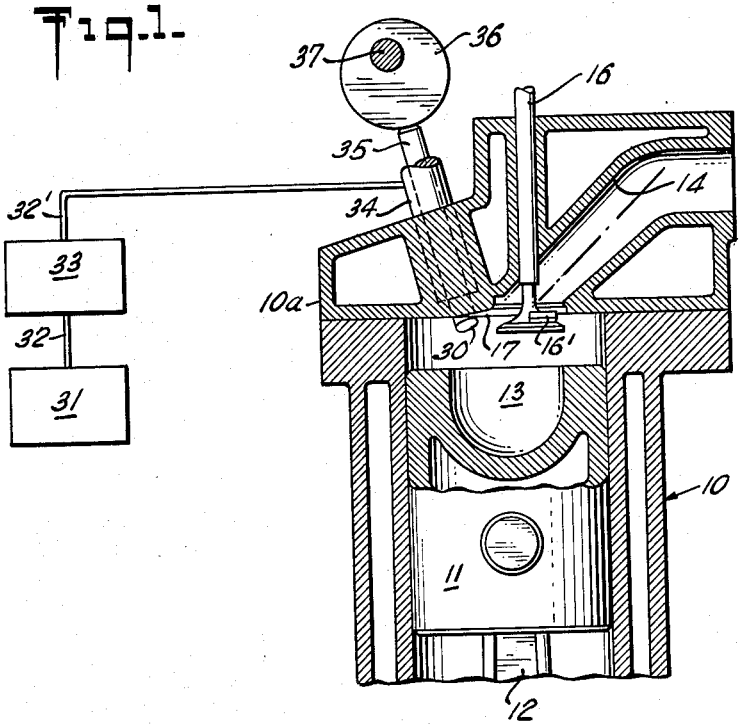
FIG. 1 is a diagrammatic cross-section taken along line 1—1 of FIG. 2, illustrating the improved construction applied to a four-stroke cycle engine cylinder with several of its operating appurtenances.
Figure 3:
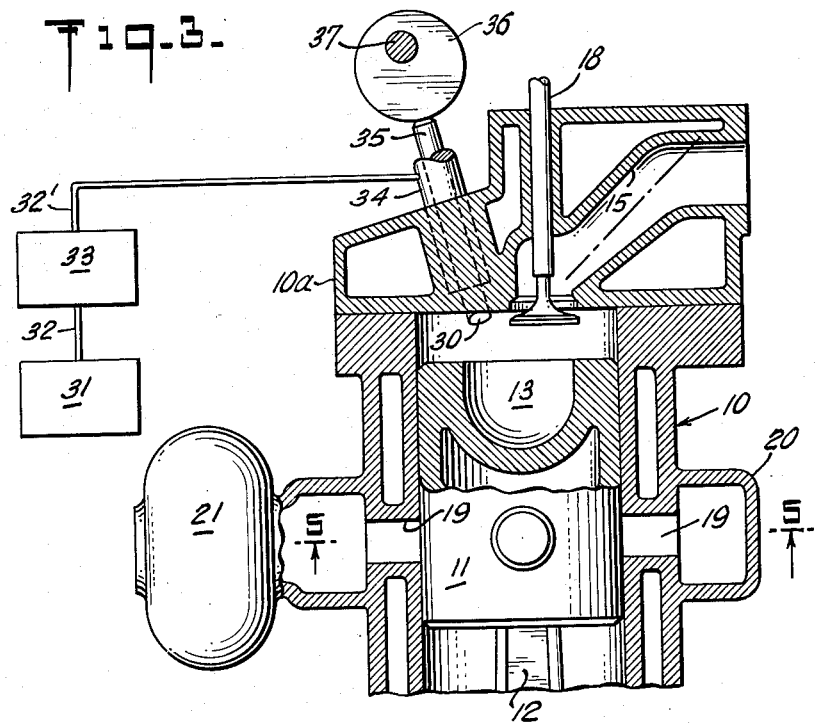
FIG. 3 is a diagrammatic cross-section taken along the line 3—3 of FIG. 4, illustrating the improved construction applied to a two stroke cycle engine cylinder with several of its operating appurtenances.

Referring to FIGS. 1 and 3, wherein common elements have the same numeration, the engine cylinder is indicated at 10, with cylinder head 10a, piston 11 and connecting rod 12 which is joined to the usual crankshaft, not shown. At the top dead center position, the piston crown approaches the adjacent cylinder head surface as closely as possible so that the cup shape cavity 13 in the piston crown contains substantially all of the remaining cylinder volume and defines the combustion chamber. (As shown in FIGS. 1 and 3 the piston is somewhat below the top dead center position.)

In the preferred embodiment of my invention, the cylinder head surface above the piston is substantially flat and normal to the axis of the cylinder and the axes of the poppet valves.

Figure 2:
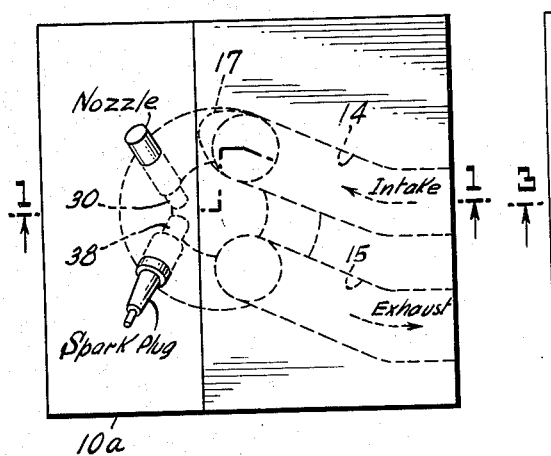
FIG. 2 is a schematic plan view of the cylinder head of the engine of FIG. 1.

Referring to FIGS. 1 and 2 which show the four-stroke cycle configuration, the cylinder head 10a is equipped with intake and exhaust passages 14 and 15 respectively, with port openings controlled by poppet valves. The intake port and valve structure is so proportioned and so located in the cylinder head as to efficiently produce a controlled air swirl in the engine cylinder. The intake port and valve structure disclosed in co-assigned U.S. Patent No. 2,768,617, issued to W. T. Tierney, Jr., and J. F. Kincaid, on October 30, 1956, the disclosure of which is incorporated herein, and wherein the intake port has the same tapered shape and tangential entry to the cylinder as shown in FIGS. 1 and 2, with the intake valve 16 equipped with a shroud 16' being particularly suitable for the practice of this invention. Intake passage 14 is in communication with an intake pipe or manifold which may contain a customary air filter, both not shown; and communicating with the exhaust passage 15 is an exhaust pipe which may contain a muffler, both also not shown.

The poppet valve seats are recessed into the cylinder head surface so that the heads of the valves are essentially flush or slightly depressed with respect to the adjacent head surface when the valves are closed in order to prevent interference between the piston crown and the valves. A fairing is cut into the head surface at the open side of the intake valve to remove the abrupt step caused by the valve head counterbore and provide for smooth flow of air into the cylinder. This fairing is shown as 17 in FIGS. 1 and 2. Alternately, the counterbored recesses in the cylinder head surface may be omitted and depressions provided in the piston crown to accommodate the protruding poppet valve heads and prevent interference with the piston crown.

Figure 4:
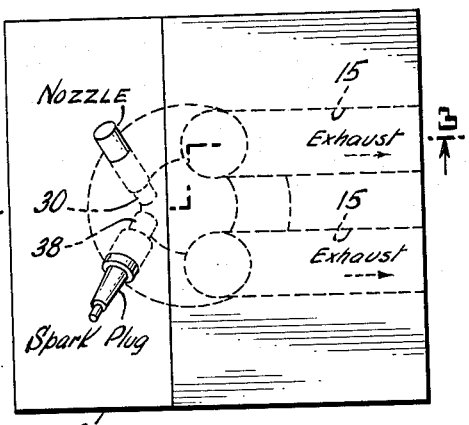
FIG. 4 is a schematic plan view of the cylinder head of the engine in FIG. 3.
Figure 5:
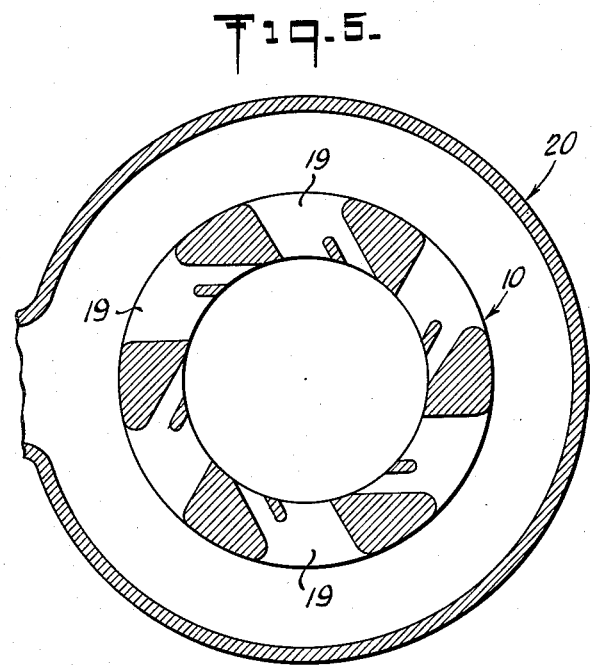
FIG. 5 is a section through the intake port belt of the engine in FIG. 3, taken along the line 5—5.

Referring to FIGS. 3, 4 and 5 which show the two-stroke cycle configuration, cylinder head 10a is equipped with exhaust port or ports 15, with port openings controlled by exhaust poppet valve(s) 18. Air intake to the cylinder is provided through cylinder intake ports 19, which are opened and closed by the piston and which are shaped and positioned so as to provide efficiently a controlled air swirl in the engine cylinder and also provide adequate scavenging thereof. The intake port structure disclosed in co-assigned U.S. Patent No. 2,758,578, issued to S. Hopkins on August 14, 1956 is particularly suitable for the practice of this invention, with the intake ports on FIG. 5 being so shown. Exhaust port 15 communicates with an exhaust pipe or manifold which may be equipped with a muffler, both not shown. Intake ports 19 are enclosed by annular muff 20 which communicates with the outlet of engine driven blower 21, the intake to which may be equipped with an air filter, also not shown.

The cup combustion chamber in the piston is centered preferably on the longitudinal axis thereof and has a maximum diameter which is less than the cylinder bore, ranging from 30 to 80 percent thereof. However, depending upon the dimensions of the piston and the intake and/or exhaust porting, the chamber may be off-center with respect to the piston axis.

Figure 10A:
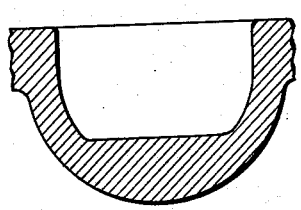
FIGS. 10a, 10b and 10c are cross sections of several additional possible cup combustion chamber shapes.
Figure 10B:
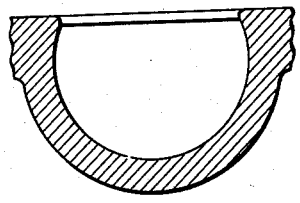
Figure 10C:
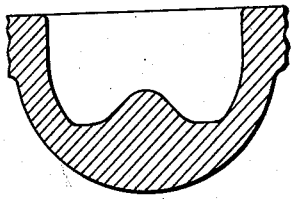

The cup combustion chamber may have the shape of a cylinder with a hemispherical bottom as shown on FIGS. 1 and 3, or it may have cylindrical sides with a flat bottom joined by a rounded fillet as shown in FIG. 10a, or it may consist of a portion of a sphere, as shown in FIG. 10b, or it may be cylindrical with a bottom having a raised central portion or pimple as shown in FIG. 10c. The opening of the cup combustion chamber at the top surface of the piston is relatively large and essentially non-restrictive to flow.

All of the above disclosed cup shapes provide a more compact combustion space with a more favorable surface-to-volume ratio than the arrangement of the prior art disk combustion chamber with the same cylinder size and compression ratio. This results in improved thermal efficiency because heat losses during combustion are reduced and mixing of the fuel and air is improved.

For proper operation of an engine of my patented non-knocking type, the air swirl r.p.m. in the combustion chamber should be from about 6 to 14 times crankshaft r.p.m. at or near top dead center on the compression stroke, when fuel injection and burning are in progress. Since the rate at which the swirling air passes the nozzle location prescribes the rate of fuel injection, it limits also the rate at which the fuel is burned and therefore, greatly influences the thermal efficiency of the engine. With air swirl rates lower than about 6 times engine r.p.m., combustion duration is too long for good efficiency; with swirl rates greater than about 14 times engine r.p.m., combustion is so rapid that rates of pressure rise may be excessive.

The air swirl rate developed in an engine according to my present invention is a combined function of the intake means and the cup combustion chamber. The air swirl rate induced in the cylinder during the induction process by the previously described shaped and directing ports is increased during compression because of the law of conservation of momentum. The rotating speed of the swirling air will increase as it is forced to flow from the cylinder into the smaller diameter cup combustion chamber in order to maintain momentum, and the increase will be in proportion to the ratio of the cylinder diameter to the cup diameter. For example, an induced air swirl rate in the cylinder of 4 times engine r.p.m. will increase to about 8.7 times engine r.p.m. in the cup at top dead center, with a cup diameter equal to 50% of the cylinder bore. This is somewhat less than the theoretical increase because of friction and clearance volume effects.

The induced air swirl rate is primarily a function of the air velocity from the intake means, the directivity features of these means and the bore/stroke ratio of the engine. With four-stroke cycle engines, port velocity depends on the cylinder size and the sizing of the intake port and valve. With two-stroke cycle engines, velocity is primarily dependent on the intake port pressure drop, port size or flow area, and is adjusted in accordance with the amount of scavenging air desired. These items and the cup diameter/cylinder bore ratio must be considered collectively, when designing to produce a desired top dead center air swirl rate. It is apparent that use of the cup combustion chamber design permits the attainment of a desired top dead center air swirl rate with a much lower induced air swirl rate. The intake velocity can be lower and/or the directivity features of the intake means less stringent. With four-stroke cycle engines, larger intake ports can be used with a corresponding improvement in high speed volumetric efficiency; with two-stroke cycle engines, less blower pressure is required and the port directivity can be adjusted for improved scavenging. Alternately, higher air swirl rates can be obtained with the same valve size or blower pressure. In practice, some gains in both of these areas are usually taken.

A fuel injection means 30, shown diagrammatically in FIGS. 1 and 3, extends through an opening in the cylinder head, and as disclosed, is directed to discharge into the cup combustion chamber. Fuel from a source of supply, such as the tank 31 is drawn through the line 32 by fuel pump 33 and forced under pressure through the line 32' to the injection means 30.

Suitable means for regulating the quantity of fuel injected and the time of fuel injection in relation to the engine cycle are employed. As diagrammatically illustrated, the fuel injection means 30 is equipped with a valve 34 having its valve stem 35 operated by a cam 36 carried by the cam shaft 37, which is interconnected to be driven by the engine in some known manner. Cam 36 may be adjusted relative to the piston stroke to control the time of fuel injection or injection advance and adjusted relative to the valve stem to control the length of time of the opening of the valve 34 to control the rate of fuel injection and the amount of fuel injected on each stroke, respectively. As controls for this purpose are well known, no further illustration thereof is thought necessary.

A spark plug 38, FIGS. 2 and 4 (or other source of positive ignition) also extends into the cup combustion chamber and is located therein downstream of the fuel injection means with respect to the air swirl motion. The spark plug is connected externally to means for producing an electrical discharge across a spark gap at an appropriate time in the cycle, these means being relatively well known in the art and so are not shown here. The arrangement for providing proper spark timing as disclosed in the co-assigned U.S. Patent No. 2,768,615, issued to C. F. Taylor and Blake Reynolds on October 30, 1956, wherein the timing of the spark discharge is regulated by the beginning of injection is particularly suitable for the practice of this invention.

The fuel spray provided by the fuel injection means must be properly located with respect to the cup combustion chamber and the swirling air therein. The source of ignition (spark gap) must in turn be properly located with respect to the fuel spray and the swirling air. The direction of entry of the fuel injection means or the ignition means into the combustion chamber is not important provided that the fuel spray and source of injection are properly located. As shown herein, the fuel spray and fuel injection means 30 arbitrarily are shown as being coaxial, with their common centerline and the centerline of the ignition means being in a common plane. The spark gap is also shown as being on the centerline of the spark plug.

Figure 6:
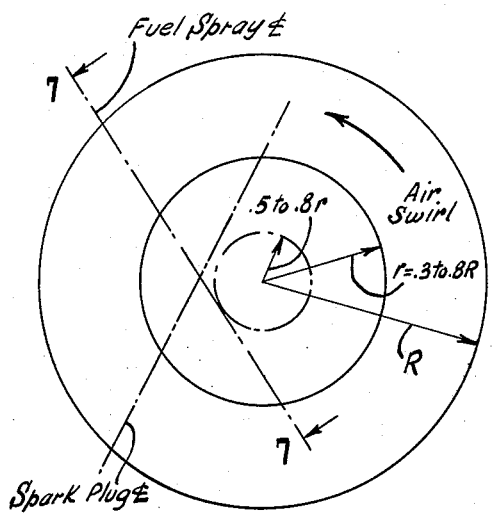
FIG. 6 is a plan view of the piston and its cup combustion chamber with horizontal projections of the fuel spray and spark plug centerlines, disclosing certain limits of the location of the fuel spray centerline for either a two or four-stroke cycle engine.
Figure 7:
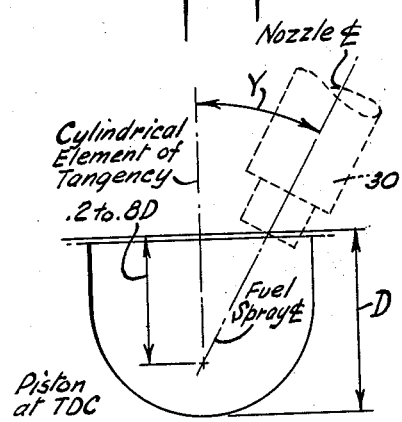
FIG. 7 is a sectional view taken in the plane indicated by the line 7—7 of FIG. 6, disclosing further limits of the location of the fuel spray centerline.

Referring to FIGS. 6 and 7, the fuel injection means 30 is disposed in the cylinder head so that the fuel is injected generally downward into the cup combustion chamber and in the downstream direction with respect to the air swirl therein. Under static conditions, neglecting the bending effect of the swirling air on the fuel spray, the spray axis is tangent to a cylinder, which is coaxial with the cup combustion chamber, and has a diameter which may vary from about 50% to 80% of the cup diameter, preferably about 70%.

The acute angle formed at the intersection of the fuel spray axis and the element of the cylinder to which it is tangent, shown at Y, ranges from 15° to 45° and is preferably about 30°, with the point of intersection on this cylindrical element being located from the bottom surface of the cylinder head or roof of the combustion chamber, a distance varying from about 20% to 80% of the depth of the cup combustion chamber measured along this element and preferably about 35% (see FIG. 7). The fuel spray from the fuel injection means 30 has a relatively narrow cone angle varying between about 5 and 35 degrees.

The spark gap of the spark plug 38 is spaced from the injection means 30 a sufficient distance to permit the formation of an ignitable mixture during the intervening travel of the injected fuel, while at the same time being sufficiently close to injection means 30 to prevent the accumulation within the combustion space of any substantial amount of combustible mixture prior to ignition.

The spark gap is located with respect to the fuel injection means and the fuel spray issuing therefrom as disclosed in the co-assigned U.S. Patent No. 2,864,347, issued to E. M. Barber and C. W. Davis, on December 16, 1958. The spark gap should be located in a plane perpendicular to the static center line of the fuel spray, such plane being located from the orifice of the fuel injection nozzle a distance indicated as A, in FIG. 8, and thence in this plane along a line which is substantially a normal projection of an air stream line which passes through the intersection of the spray centerline and this plane, a distance in the direction of air motion indicated as B, in FIG. 8, and thence still in the same plane, perpendicular to the distance indicated as B, a distance indicated as C, FIG. 9.

Figure 8:
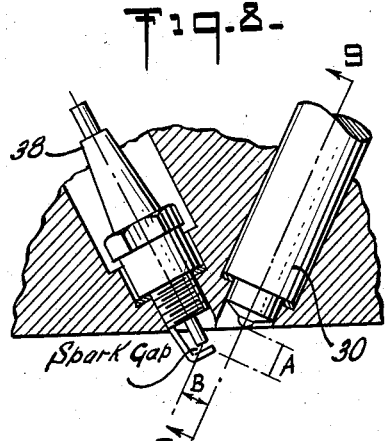
FIG. 8 is a view of a common plane passing through the centerlines of the fuel spray and spark plug, disclosing certain limits of the location of the spark gap with respect to the fuel spray origin and the fuel spray centerline for either a two or four-stroke cycle engine.
Figure 9:
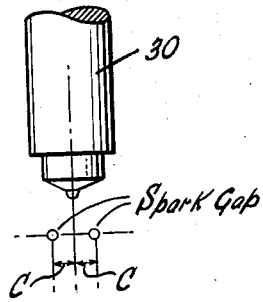
FIG. 9 is a view taken along the fuel spray centerline in the plane indicated by the line 9—9 of FIG. 8, disclosing further limits of the location of the spark gap.

The spacing of the plane along the spray centerline from the nozzle orifice, indicated as A in FIG. 8, has the range limits of from 0.35 inch to 0.70 inch; the downstream distance in this plane, indicated as B in FIG. 8, has the limits of from 0.10 inch to 0.40 inch, and the further spacing, indicated as C, FIG. 9, has the range limits of from 0 inch to 0.25 inch. The determination of the location of the spark gap with respect to the injection nozzle orifice, fuel spray axis and swirling air motion within the limits of A, B, and C, as set forth above, in combination with the fuel spray location and shape specifications disclosed previously, will result in its proper positioning to achieve the objects of my invention.

In accordance with my present invention, the radial distance from the center of air rotation to the location of the sources of fuel injection and ignition is considerably less than with previous arrangements, since these items are now near the edge of the cup combustion chamber rather than near the edge of the cylinder bore. Accordingly, the air velocity at this point for a given air swirl r.p.m. is less, the bending effect of the air motion on the fuel spray is less, and ignition is therefore easier to achieve and more reliable over a broader speed range.

In operation, a charge of air unmixed with fuel, or containing less than that amount of fuel which will support combustion, is admitted to the cylinder during the intake period. This air or dilute fuel-air mixture, is then compressed on the compression stroke of the piston. The swirling movement imparted to the air during induction is increased by displacement into the cup during compression and continues throughout combustion because of inertia.

Near and generally somewhat before the top dead center position of the piston on the compression stroke, fuel injection is initiated, ignition is effected immediately and combustion continues as previously described so that the required power output on each firing cycle of the engine is developed without knock, misfire or precombustion. Fuels having any octane or cetane number rating and very broad volatility characteristics can be used indiscriminately, and compression ratio or supercharging is not limited by detonation as with Otto cycle engines, nor is compression ratio restricted to a high value by the requirement for compression ignition as in a diesel engine.

The improvements in power and fuel economy obtained by operating a four-stroke cycle engine of the patented non-knocking type in accordance with this invention, as compared to the results obtained with the cylindrical disk combustion chamber are shown on FIG. 11, wherein the solid line represents the engine performance with the present invention and the broken line performance from the prior art construction.

The improvements in full load output over a broader operating speed range obtained by operating a four-stroke cycle engine of the patented non-knocking type in accordance with this invention are shown in FIG. 12, wherein the solid line again represents the engine performance with the present invention and the broken line the prior art performance.

Thus, there has been shown and described an improved non-knocking internal combustion engine wherein better performance is obtained by the use of a cup combustion chamber, an improved intake passage arrangement and improved location of ignition and injection means, which results in higher volumetric efficiency, higher air swirl rate, better combustion, reduced heat losses and more reliable ignition characteristics.

Although the foregoing disclosure has been drawn to a spark ignition set-up for the positive ignition of the initially formed combustible fuel-air mixture, other positive ignition means can be used to ignite the first increment of injected fuel as soon as a combustible fuel-air mixture is formed therefrom. For example, a glow plug or glow wire can be substituted for the disclosed spark plug.

In addition, the present invention may be practiced with combustion being initiated by compression ignition and the remainder of the combustion cycle being conducted as described herein, this method of operating non-knocking engines of this type being disclosed in co-assigned U.S. Patent No. 2,977,942, issued to Blake Reynolds on April 4, 1961. If the compression ignition method of operation is employed, the compression ratio of the engine and the cetane number rating of the fuel used must be such that compression ignition can be readily accomplished, and the use of positive ignition means may be dispensed with.

This application is a continuation-in-part of my application Serial No. 772,230, filed on November 6, 1958.

Obviously, other modifications and variations of the invention, as hereinbefore set forth, may be made without departing from the spirit and scope thereof, and therefore, only such limitations should be imposed as are indicated in the appended claims.

I claim:

1. In combination in an internal combustion engine, a cylinder and a piston operating therein and a cylinder head defining a combustion chamber therewith, intake means for said combustion chamber adapted to introduce air thereinto and to impart a high velocity of swirling movement thereto, a fuel injection nozzle carried by said cylinder head to provide a fuel spray into said combustion chamber so that at least a portion of the first increment of injected fuel forms with a localized portion of swirling air an ignitable fuel-air mixture adjacent said nozzle, means for supplying fuel to said nozzle, ignition means protruding into said combustion chamber close to said nozzle and fuel spray therefrom so that said ignitable fuel-air mixture formed from said first increment of injected fuel envelops the protruding part of said ignition means substantially as soon as it is formed, means coordinated with engine operation for controlling the start of injection of fuel from said nozzle during the latter part of the compression stroke of said piston, means synchronized with engine operation for energizing said ignition means at the time said ignitable fuel-air mixture formed from said first increment of injected fuel reaches said protruding part of said ignition means to initiate combustion and establish a flame front, and means for controlling the rate and duration of fuel injection following ignition to impregnate shortly in advance of said flame front additional quantities of swirling air at a controlled fuel-air ratio to form and burn progressively additional combustible fuel-air mixture ignited by said flame front substantially as rapidly as formed to provide the power required on each cycle, said combustion chamber being located substantially within said piston and having a cup shape with a circular cross section normal to the piston axis to define an open combustion chamber, the maximum diameter of said open combustion chamber exclusive of the entrance chamber ranging from about 30% to about 80% of the bore of said cylinder, the center line of said fuel spray under static conditions being tangent to an imaginary cylinder with an axis parallel to the cylinder axis and centered with the cup shape open combustion chamber and having a diameter which may vary from about 50% to about 80% of the combustion chamber diameter, the angle of intersection between the static fuel spray center line and the element of said imaginary cylinder to which it is tangent ranging from about 15° to about 45°, the point of intersection on the cylindrical element being located from about 20% to about 80% of the depth of the combustion chamber measured along this element from the bottom surface of the cylinder head.

2. In the combination as described in claim 1, said ignition means comprising a spark ignition device having electrodes extending into said combustion chamber with a spark gap between said electrodes positioned in a plane which is normal to the static center line of the fuel spray from said fuel injection means and located from the orifice thereof a distance ranging from about 0.35" to about 0.70" and thence in this plane in the direction of the air motion in the combustion chamber along a line which is substantially a normal projection of an air stream line which passes through the intersection of the spray centerline with this plane a distance between about 0.10" and about 0.40" from said center line, and in the same plane at right angles to this last mentioned distance not more than about 0.25", said fuel injection means being of the type comprising a nozzle which produces a narrow angle penetrating spray, said angle varying between about 5° and about 35°.

3. In the combination as defined in claim 2, the cup shape combustion chamber having a substantially flat bottom surface.

4. In the combination as defined in claim 2, the cup shape combustion chamber having a pimple in the bottom thereof.

5. In the combination as defined in claim 1, the cup shape combustion chamber having cylindrical walls.

6. In the combination as defined in claim 5, the bottom of said combustion chamber having a spherical configuration.

7. In the combination as defined in claim 5, said combustion chamber having a substantially flat bottom surface.

8. In the combination as defined in claim 5, said combustion chamber having a pimple in the bottom thereof.

9. In the combination as defined in claim 1, said intake means for introducing air including an intake passage with an intake port at the outlet end thereof and a poppet valve for operative functioning with said port.

10. In the combination as defined in claim 1, said intake means for introducing air including an intake passage ending in a plurality of ports located on the cylinder wall adjacent the bottom dead center position of the piston.

11. In the combination as defined in claim 1, the cup shape combustion chamber being greater than a hemispherical portion of a sphere.

12. In the combination as defined in claim 1, said ignition means comprising a glow plug extending into said combustion chamber.

13. In the combination as defined in claim 1, said cup shape open combustion chamber being coaxial with said piston.

14. In an internal combustion engine, the combination comprising a cylinder head, a power cylinder having a piston with a cup shape chamber operating therein and with said head defining an open combustion chamber, intake means for said cylinder for introducing air into said combustion chamber and for imparting a high velocity of swirling movement thereto, fuel injection means in said cylinder head for injection of fuel into said combustion chamber, means co-ordinated with engine operation for controlling the start of fuel injection during the latter part of the compression stroke of said piston whereby a portion of the first increment of injected fuel forms with a localized portion of the swirling air an ignitable fuel-air mixture to initiate combustion and establish a flame front, and means for controlling the rate and duration of injection of fuel following ignition to form additional combustible fuel-air mixture for burning to provide the power required on each cycle, said means coordinated with engine operation controlling the start of fuel injection so that said fuel-air mixture formed from said portion of said first increment of injected fuel is ignited by compression, the center line of the fuel spray from said fuel injection means, under static conditions, being tangent to an imaginary cylinder with an axis parallel with the cylinder axis and centered with said cup combustion chamber and having a diameter which may vary from 50% to 80% of the cup combustion chamber diameter, the angle of intersection between the static fuel spray center line and element of said imaginary cylinder to which it is tangent ranging from 15° to 45°, the point of intersection on the cylindrical element being located from 20% to 80% of the depth of the combustion chamber measured along this element from the bottom surface of the cylinder head.

15. In an internal combustion engine as defined in claim 14, said cup combustion chamber being coaxial with said piston.

16. In the combination as defined in claim 14, said intake means including an intake passage having an outlet end terminating as the intake port of said combustion chamber, and a poppet valve adapted to be reciprocated into closed and open relationship with the outlet end of said intake passage at said port.

17. In the combination as defined in claim 14, said intake means for introducing air including an intake passage ending in a plurality of ports located on the cylinder wall adjacent the bottom dead center position of the piston.

No references cited.